(12) United States Patent
Hinds et al.

(10) Patent No.: US 11,284,109 B2
(45) Date of Patent: Mar. 22, 2022

(54) VISUAL CODING FOR SENSITIVITIES TO LIGHT, COLOR AND SPATIAL RESOLUTION IN HUMAN VISUAL SYSTEM

(71) Applicant: Cable Television Laboratories, Inc., Louisville, CO (US)

(72) Inventors: Arianne T. Hinds, Louisville, CO (US); Isaac Elliott, Broomfield, CO (US); Steve Glennon, Lafayette, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 171 days.

(21) Appl. No.: 16/040,588

(22) Filed: Jul. 20, 2018

(65) Prior Publication Data

US 2018/0352255 A1    Dec. 6, 2018

Related U.S. Application Data

(63) Continuation-in-part of application No. 15/419,858, filed on Jan. 30, 2017, now Pat. No. 10,110,935.

(60) Provisional application No. 62/534,982, filed on Jul. 20, 2017, provisional application No. 62/288,538, filed on Jan. 29, 2016.

(51) Int. Cl.
| | |
|---|---|
| *H04N 19/597* | (2014.01) |
| *G06T 9/00* | (2006.01) |
| *H04N 19/186* | (2014.01) |
| *H04N 19/115* | (2014.01) |
| *H04N 19/167* | (2014.01) |
| *H04N 19/132* | (2014.01) |

(52) U.S. Cl.
CPC ............. *H04N 19/597* (2014.11); *G06T 9/00* (2013.01); *H04N 19/115* (2014.11); *H04N 19/132* (2014.11); *H04N 19/167* (2014.11); *H04N 19/186* (2014.11)

(58) Field of Classification Search
CPC .. H04N 19/597; H04N 19/115; H04N 19/167; H04N 19/132; H04N 19/186; G06T 9/00
USPC ..................................................... 375/240.02
See application file for complete search history.

(56) References Cited

U.S. PATENT DOCUMENTS

| | | | |
|---|---|---|---|
| 5,737,060 A | 4/1998 | Kasha, Jr. ................ | A61B 3/00 351/224 |
| 5,933,253 A * | 8/1999 | Ito ........................ | H04N 1/6058 358/500 |
| 6,028,608 A | 2/2000 | Jenkins ................ | G06T 1/0021 345/619 |
| 6,351,335 B1 | 2/2002 | Perlin .................... | G02B 13/00 345/1.1 |

(Continued)

*Primary Examiner* — Tung T Vo
(74) *Attorney, Agent, or Firm* — Great Lakes Intellectual Property PLLC

(57) ABSTRACT

A visual coding system is contemplated to facilitate encoding and decoding of visuals, representations, images, etc. utilized to facilitate immersive, augmented reality (AR), virtual reality (VR), light field or other types of video. The visual coding system may facilitate coding, scaling, segmenting, tiling, or otherwise processing portions of individual frames differently depending on light, color and/or spatial resolution sensitivities of the human visual system (HVS), such as to account for the HVS processing light/color information unequally/differently across its field of view.

18 Claims, 6 Drawing Sheets

(56) References Cited

U.S. PATENT DOCUMENTS

| | | | |
|---|---|---|---|
| 7,010,169 B2* | 3/2006 | Kortum | H04N 19/162 375/E7.172 |
| 7,027,655 B2 | 4/2006 | Keeney | H04N 19/115 375/E7.182 |
| 7,950,029 B2 | 5/2011 | Andreyko | H04N 7/147 348/377 |
| 9,491,490 B1* | 11/2016 | Toth | H04N 19/115 |
| 9,723,199 B1 | 8/2017 | Goyal | H04N 21/4728 |
| 10,373,592 B2* | 8/2019 | Tall | G06F 3/013 |
| 2003/0142099 A1* | 7/2003 | Deering | G09G 5/391 345/531 |
| 2003/0198393 A1* | 10/2003 | Berstis | G06F 3/013 382/239 |
| 2004/0010803 A1* | 1/2004 | Berstis | H04N 5/23293 725/105 |
| 2005/0018911 A1* | 1/2005 | Deever | H04N 19/597 382/232 |
| 2008/0111833 A1 | 5/2008 | Thorn | G09G 5/00 345/690 |
| 2010/0149073 A1* | 6/2010 | Chaum | G02B 27/0172 345/8 |
| 2010/0283972 A1 | 11/2010 | Plant | A61B 3/113 351/210 |
| 2011/0182356 A1* | 7/2011 | Ammu | H04N 19/197 375/240.03 |
| 2013/0156311 A1* | 6/2013 | Choi | H04N 9/642 382/166 |
| 2013/0195206 A1* | 8/2013 | McCarthy | H04N 19/46 375/240.27 |
| 2014/0198938 A1* | 7/2014 | Dave | H04R 25/50 381/317 |
| 2014/0292751 A1* | 10/2014 | Azar | G06T 9/00 345/420 |
| 2015/0022435 A1* | 1/2015 | Luebke | G06F 3/013 345/156 |
| 2015/0078459 A1 | 3/2015 | McCuller | H04N 7/5006 375/240.25 |
| 2015/0145777 A1* | 5/2015 | He | G06F 3/0325 345/158 |
| 2015/0205126 A1 | 7/2015 | Schowengerdt | G06T 13/40 345/633 |
| 2015/0264299 A1 | 9/2015 | Leech | H04N 7/0117 348/78 |
| 2015/0279418 A1* | 10/2015 | Laksono | G11B 20/10527 386/248 |
| 2016/0179196 A1 | 6/2016 | Chang | G06F 3/013 345/589 |
| 2016/0328884 A1 | 11/2016 | Schowengerdt | G02B 6/32 |
| 2017/0011492 A1 | 1/2017 | Thunstrom | G06F 3/013 |
| 2017/0054987 A1* | 2/2017 | Rangarajan | H04N 19/167 |
| 2017/0068312 A1 | 3/2017 | Mallinson | G06F 3/013 |
| 2017/0142447 A1* | 5/2017 | Toth | H04N 19/115 |
| 2017/0169602 A1* | 6/2017 | Blackmon | G06T 15/005 |
| 2017/0285736 A1* | 10/2017 | Young | G06F 3/013 |
| 2017/0287446 A1* | 10/2017 | Young | G06F 3/013 |
| 2017/0295373 A1* | 10/2017 | Zhang | H04N 19/136 |
| 2018/0089091 A1* | 3/2018 | Akenine-Moller | G06T 1/60 |
| 2018/0137602 A1* | 5/2018 | Spitzer | G06F 3/4007 |
| 2018/0167613 A1* | 6/2018 | Hannuksela | H04N 21/4728 |
| 2018/0167634 A1* | 6/2018 | Salmimaa | H04N 19/187 |
| 2018/0176535 A1* | 6/2018 | Ninan | G06F 3/013 |
| 2018/0192058 A1* | 7/2018 | Chen | G06T 3/403 |
| 2018/0227630 A1* | 8/2018 | Schmidt | H04N 21/44218 |
| 2018/0262758 A1* | 9/2018 | El-Ghoroury | H04N 19/44 |
| 2018/0288423 A1* | 10/2018 | Vembar | H04N 19/503 |
| 2018/0332192 A1* | 11/2018 | Thumpudi | H04N 19/184 |
| 2019/0361526 A1* | 11/2019 | Young | G06F 3/011 |
| 2020/0081524 A1* | 3/2020 | Schmidt | G06F 3/012 |

* cited by examiner

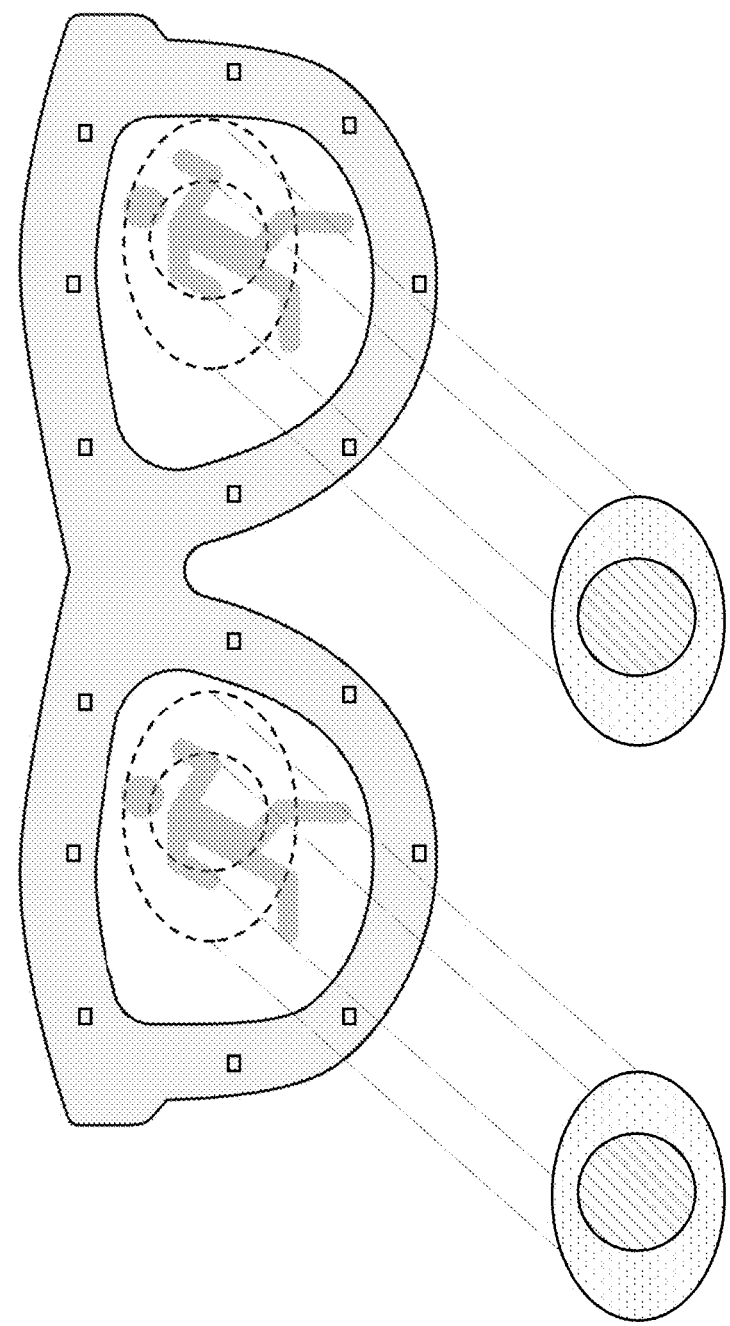

VISUAL CODING FOR SENSITIVITIES TO LIGHT, COLOR AND SPATIAL RESOLUTION IN HUMAN VISUAL SYSTEM

CROSS-REFERENCE TO RELATED APPLICATIONS

This application is a continuation-in-part of U.S. patent application Ser. No. 15/419,858, filed Jan. 30, 2017, which claims the benefit of and priority to U.S. Provisional Patent Application Ser. No. 62/288,538, filed Jan. 29, 2016, the disclosures of which are incorporated in their entireties by reference herein.

This application claims the benefit of and priority to U.S. Provisional Patent Application Ser. No. 62/534,982, filed Jul. 20, 2017, the disclosure of which is incorporated in its entirety by reference herein.

TECHNICAL FIELD

The present invention relates to visual coding systems, such as but not necessary limited to visual coding systems utilized to facilitate encoding and decoding of visuals, representations, images, etc. utilized to facilitate immersive, augmented reality (AR), virtual reality (VR), light field or other types of visual media.

BACKGROUND

Visual coding may be characterized as a process whereby uncompressed visual media representations are modified, compressed or otherwise coded for transmission and/or rendering, such as to facilitate subsequent display on a screen or other mechanism suitable to facilitate interfacing the related visual content with a viewer. High Efficiency Video Coding (HEVC) and Advanced Video Coding (AVC) are examples of compression standards for video (one particular form of visual media) coding having capabilities to facilitate implementing progressive and other forms of scalable coding tools. These and/or other coding tools may be utilized to facilitate scaling an uncompressed image to a compressed image according to different quality parameters, which in the case of video may include frame size (resolution/detail), frame rate (fluidity of motion) and color depth (quantization or smoothness of shading). (The term frame refers to a single image amongst a series of images that contains either the entire area of the media visible to the viewer, or a sub-portion (usually rectangular in shape) of the viewable area. Those skilled in the art typically refer to the frame sub-portion as a tile.) The amount of data required to transmit a video following coding is proportional to application of the quality parameters, e.g., a video coded at a greater frame size, frame rate or color depth will require more data for transmission than the same video coded at a lesser frame size, frame rate or color depth. Coding tools like HEVC and AVC balance the quality parameters versus the attendant amount of data needed for transmission and thereafter apply scaling of the corresponding images, which at a frame level is done uniformly such that each frame has a consistent and a constant coding throughout.

The present invention contemplates accounting for coding of a frame (or frames) in a field of view that fail to sufficiently meet the perception capabilities of a human visual system (HVS). The HVS processes light/color information unequally/differently across a field of view, e.g., a person viewing a frame fails to process light/color equally across an entirety of the frame due to the HVS being more sensitive to light in peripheral vision and more sensitive to color information at a center field of view. One non-limiting aspect of the present invention contemplates visual coding portions of individual frames differently depending on light, color and/or spatial resolution sensitivities of the HVS to account for the HVS processing light/color information unequally/differently across its field of view.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 5-6 illustrate segmenting image frames according to saccadic movement in accordance with one non-limiting aspect of the present invention.

Figure 1:
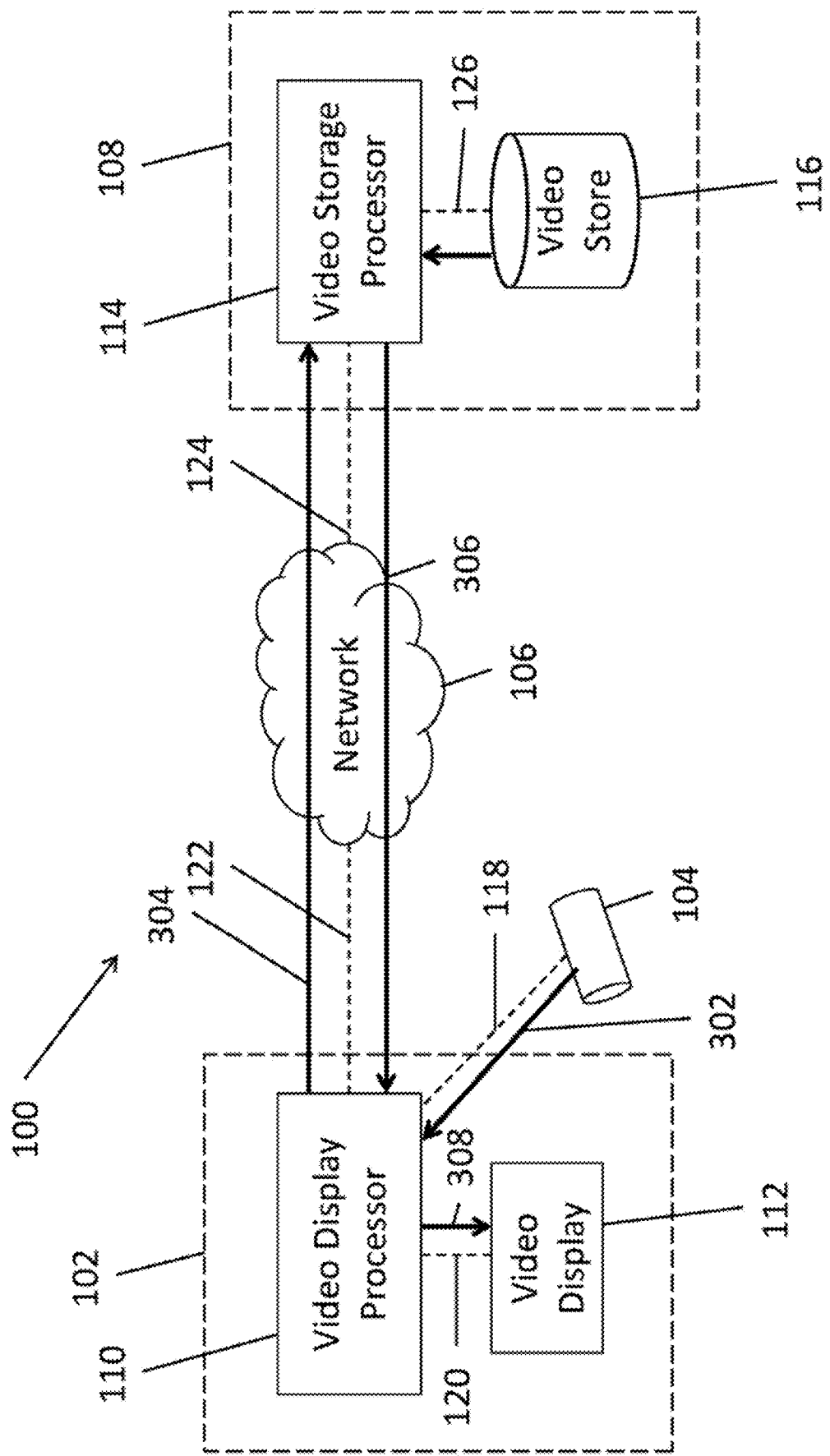
FIG. 1 is a schematic illustration of an exemplary system for delivering immersive visual content for a viewer, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Immersive video, or virtual reality video, is visual content that includes some or all a panorama, and when viewed through a head-mounted display or within surrounding screens, includes some or all a 360-degree panorama in the horizontal and/or vertical directions. Some conventional immersive video systems include an immersive screen and a video storage source. Immersive video delivered to the immersive screen from the video storage source that is in the same location as the immersive screen, or from a remote location that requires the delivery of the video over a network. In these conventional systems, immersive video must be transferred from a source to a screen. This transfer consumes resources between the video source and the screen and creates demands on the computing resources that host the video storage and the video screen, and on all elements/devices therebetween. Consumption of such resources increases costs and may further limit the quality of the delivered video content to the consumer.

The embodiments herein describe and illustrate an immersive video system that delivers video, or immersive content, based on saccadic eye motion. Immersive video, or virtual reality, is video that includes some or all a panorama, and when viewed through a head-mounted display or within surrounding screens, includes some or all a 360-degree panorama in the horizontal and/or vertical directions. Immersive video delivered to the video display system from the video storage system that is in the same location as the video display system, or from a remote location that requires the delivery of the video over the network. In either case, immersive video must be transferred from a source to a screen. This transfer consumes resources between the video storage system and the video display system and creates demands on the computing resources that host the video storage system and the video display system, and on all elements in between. Systems and methods according to the embodiments herein are capable of advantageously conserving these resources, thereby creating cost savings for content delivery, as well as better viewer experiences at a lower cost. The present systems and methods are thus further capable of delivering viewer experiences that would otherwise be relatively impossible to deliver on conventional systems.

The embodiments of the immersive video system described herein conserve these resources by tracking the saccadic motion of the eye with the eye tracking video camera. As described further below, an immersive video system includes a video display system, an eye tracking video camera, an electronic network, and a video storage system. The immersive video system provides high quality rendering of the immersive video in the video display system that the eye will be viewing. The immersive video system also provides lower quality rendering of the immersive video in the area of the video display system that the eye will not be viewing. By providing lower quality rendering in areas that the viewer's eye is not directly viewing, the present embodiments are better able to conserve resources by sending predominantly high-quality rendering to a field where the viewer's eye will directly view the content.

The biology of the human eye concentrates a very high number of rods and cones in a small area in the center of a focus of each eye, called a foveal area. A diameter of the foveal area is relatively small and can be limited to a range of approximately two degrees. Human eyes though, have their greatest ability to see detail and color gamut within this relatively small area. Additionally, the foveal area of the human eye is surrounded by a blend area having a range of about ten degrees, and greater diameter, in which the eye has a lower ability to focus and recognize details. Outer to the blend area is a peripheral vision area, where the human eye has a significantly more limited ability to view detail.

Embodiments of the immersive video systems and methods described herein advantageously conserve valuable content delivery resources by delivering higher quality detailed content, i.e., higher resolution, to the field of a display where the human eye is viewing, and lower resolution content to the field where the eye is not most directly viewing (e.g., the blend and peripheral regions). The present embodiments are thus described below with respect to a display that is dedicated to the use of a single viewer. However, a person of ordinary skill in the art, after reading and comprehending the present disclosure, will understand how the present embodiments may be utilized with respect to both eyes of a single viewer or multiple viewers, e.g., through the use of multiple cameras, or a single camera having the ability to track more than one eye at a time. The present systems and methods are configured to track the movement of one or more human eyes to determine where the eye is looking, and accordingly adjust the detail/resolution shown on a video display to deliver higher quality content to the fields of the display where the eye is best able to see detail.

Additionally, the direction of view is not limited to only eye movement, e.g., humans may change their visual field by keeping the head, neck, and body stationary while moving the eyes alone. Humans, however, may also change their visual field by a coordinated movement of the head, neck, or body, in addition to just movement of the eyes. This movement of the eyes alone is referred to as a saccade, or saccadic movement. Saccadic movements of the eyes are also referred to as "stereotyped" and "ballistic" movements. Stereotyped saccades refer to the situation where saccades generally are known to follow a similar pattern to each other. That is, the velocity of the visual field moving by a saccadic motion corresponds to an increase in a similarly stereotyped way. Ballistic saccades refer to the situation where the destination of the movement is predetermined at the beginning of the movement.

Typical saccade movements made toward a target field of view have a mean duration between 150 ms and 250 ms. The mean duration is long enough for embodiments of the immersive video systems and methods described herein to detect a start of a saccade movement, predict the destination of the saccade movement, and react by changing what is being displayed at the target field of view prior to the eye's arrival at the target field of view. As such, embodiments of the immersive video systems and methods described herein predicts where an eye is going to look based upon the very beginning of its motion, well before the field of view has reached the target field of view.

Embodiments of the immersive video systems and methods described herein advantageously adapts the fidelity of displayed content in the target field of view based on predicting where the viewer is about to look. Additionally, embodiments of the immersive video systems and methods described herein adapts the streaming delivery of content to account for the viewer's current field of view, and the viewer's target field of view, to reduce the total number of bits that need to be delivered to render the scene for the viewer.

FIG. 1 is a schematic illustration of an exemplary system 100 for delivering immersive video content for a viewer (not shown). According to the exemplary embodiment, system 100 is an immersive video content delivery system for displaying content based, at least in part, on saccadic eye movement of the viewer. In the exemplary embodiment, immersive video content includes immersive content, video, virtual reality, and immersive video. System 100 includes a client display device or video display system 102, an eye tracking device or eye tracking video camera 104, an electronic network 106, and a video storage system 108. Video display system 102 includes a video display processor, eye tracking processor, or first processor 110 and a video display 112. Video storage system 108 includes a video storage processor or second processor 114 and a video storage device 116. Electronic network 106 includes one or more of an intra-computer bus, a local area network, an optical network, a hybrid fiber coax network, a wireless network, or a wide area network such as the Internet. In an exemplary embodiment, video display 112 includes one or more of a head-mounted display or a plurality of surrounding screens that includes some or all a 360-degree panorama in the horizontal and/or vertical directions.

In an embodiment, video display processor 110 and video display 112 are integrated in a single device or video display system 102. In an alternative embodiment, video display processor 110 is separate from video display 112. In another embodiment, video display processor 110, video display 112, and eye tracking video camera 104 are integrated in a single device or video display system 102. In an alternative embodiment, video display system 102, eye tracking video camera 104, electronic network 106, and video storage system 108 are integrated into a single device or immersive video system 100.

In the embodiment illustrated in FIG. 1, eye tracking video camera 104 electronically communicates with video display system 102 by a camera communications link 118. In an example of the embodiment, eye tracking video camera 104 electronically communicates with video display processor 110 by camera communications link 118. Video display 112 electronically communicates with video display processor 110 by a video display communications link 120. Video display system 102 may also communicate with electronic network 106 by a video display processor communications link 122. In an exemplary embodiment, video display processor 110 electronically communicates with electronic network 106 by video display processor communications link 122. Electronic network 106 communicates with video storage system 108 by a network communications link 124. More specifically, electronic network 106 electronically communicates with video storage processor 114 by network communications link 124. Video storage device 116 electronically communicates with video storage processor 114 by a video storage communications link 126.

Figure 2:
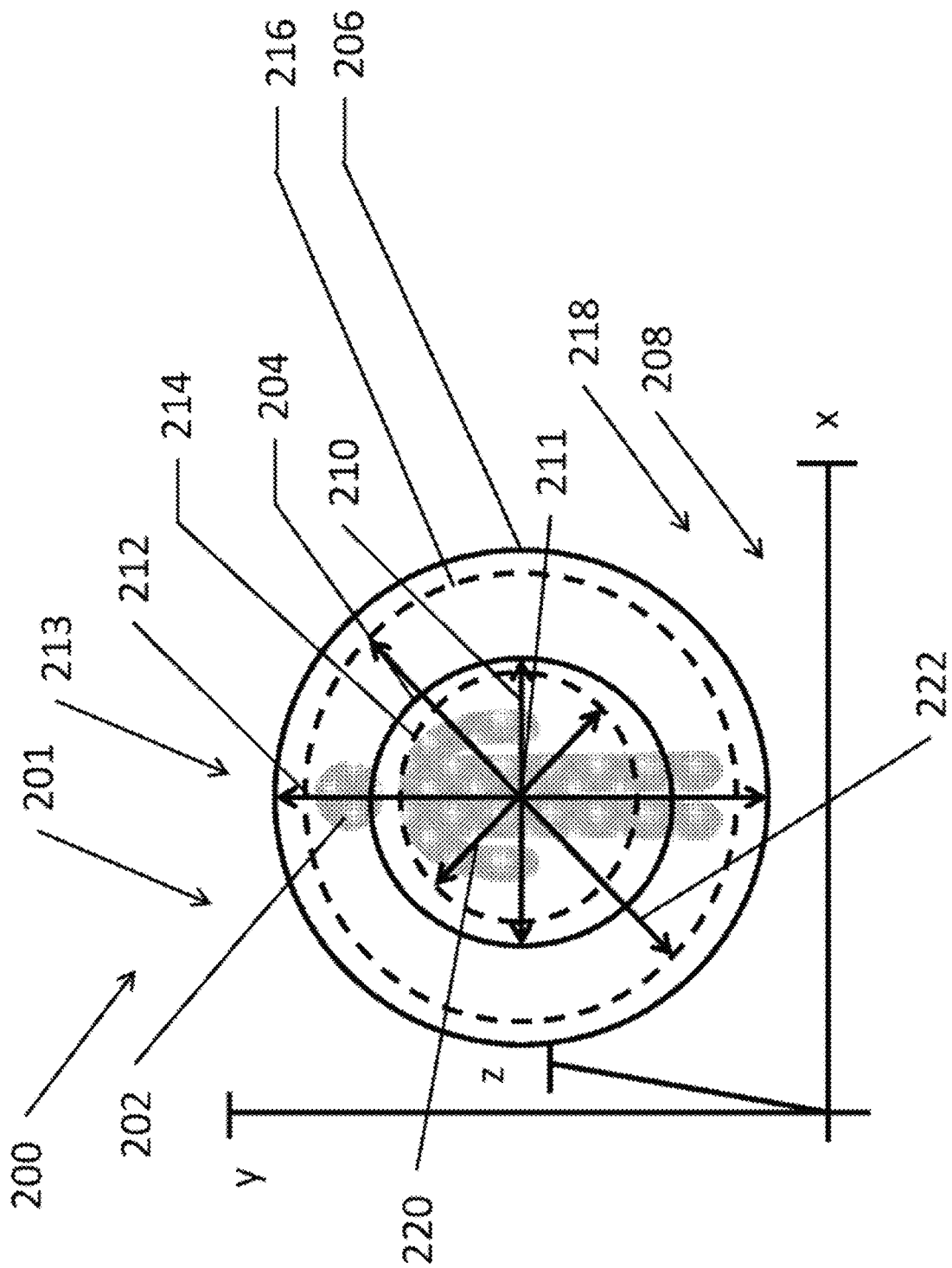
FIG. 2 illustrates an exemplary content layout associating content resolution with a viewer's field of view, in accordance with the system depicted in FIG. 1.

FIG. 2 illustrates an exemplary content layout 200 for associating content resolution with a viewer's field of view, which may be implemented with the system depicted in FIG. 1. Content layout 200 includes a plurality of viewable display regions 201 about an object 202 in layout 200. In the exemplary embodiment, viewable display regions 201 include two or more of a foveal region 204, a blend region 206, and a peripheral region 208. In the exemplary embodiment, the viewer (not shown) is focused on object 202, which is centered within foveal region 204. For purposes of explanation, foveal region 204 represents the region on a display (not numbered) of content layout 200 corresponding the foveal portion of the viewer's eye (containing the relatively higher number of rods and cones) that centers and focuses its gaze on object 202. Foveal region 204 includes a foveal region diameter 210 and is surrounded by blend region 206. Peripheral region 208 surrounds blend region 206. Foveal region 204, blend region 206, and peripheral region 208 are concentrically centered about central point 211. Blend region 206 includes a blend region diameter 212.

Content layout 200 also includes a plurality of display resolution zones 213. Display resolution zones 213 include two or more of a high-quality rendering zone 214, a medium quality rendering zone 216, and a low-quality rendering zone 218. That is, high quality rendering zone 214 contains relatively higher image resolution than medium quality rendering zone 216, and medium quality rendering zone 216 contains relatively higher image resolution than low quality rendering zone 218. As explained further below, an imaging processor (e.g., video display processor 114, FIG. 1) is configured such that display resolution zones 213 are concentrically centered substantially about central point 211, such that, in an exemplary embodiment, high quality rendering zone 214 substantially overlaps with foveal region 204. In a similar manner, medium quality rendering zone 216 substantially overlaps with blend region 206, and low-quality rendering zone 218 substantially overlaps with peripheral region 208.

According to the exemplary embodiment, the different diameters of high quality rendering zone 214, medium quality rendering zone 216, and low-quality rendering zone 218 generally correspond, about central point 211, to those of foveal region 204, blend region 206, and peripheral region 208, respectively. Alternatively, the respective diameters of display resolution zones may be larger or smaller than those of the corresponding viewable display regions 201. In the embodiment shown in FIG. 2, high quality rendering zone 214 and medium quality rendering zone 216 are illustrated to be circular regions having a high-quality rendering region diameter 220 and a medium quality rendering region diameter 222, respectively. In an alternative embodiment, high quality rendering zone 214 and medium quality rendering zone 216 may have any shape which enables system 100 to operate as described herein, including, without limitation, square and rectangular shapes disposed regularly about central point 211.

In operation, eye tracking video camera 104 is configured to be aimed toward at least one eye (not shown) of the viewer, and to record video at a sufficient frame rate to track movement of the eye, for example, 240 frames per second (fps). At 240 fps, an image frame is received by video display processor 110 approximately every 4 ms. Video display processor 110 is further configured to determine, from the received image frames, the relative position of the field of view within each image frame. Thus, if the field of view of the eye begins to shift from saccadic motion, video display processor 110 is configured to determine velocity, acceleration, and direction of travel of the field of view, and further to predict the destination of the field of view. In exemplary embodiment, the determination of the destination of the field of view can be made based on three frames (or 12 ms of samples) from eye tracking video camera 104. Saccadic motion has an average saccadic duration of approximately 200 ms. Thus, on average, video display processor 110 has approximately 188 ms to determine the destination of the field of view and to react to that information. The amount of time video display processor 110 has to react to the saccadic motion of the field of view can then be determined as a function of distance of eye motion travel within the field of view, in degrees.

Embodiments of system 100 and methods described herein may be optimized locally or remotely. "Local optimization" refers to the optimization of the transfer of data from video display processor 110 to video display 112. "Remote optimization" refers the optimization of the transfer of data over electronic network 106 between video storage processor 114 and video display processor 110. System 100 is configured to further consider a network quality metric to measure the quality of electronic network 106. The network quality metric considers multiple parameters of electronic network 106, including latency, congestion, and bit error rate. Latency, for example, includes the amount of time data takes to travel from one point in electronic network 106 to another point in electronic network 106. In an embodiment, system 100 further includes a predetermined high-quality area that is the minimum area occupied by high quality rendering zone 214 on video display 112.

In further operation, system 100 is configured to engage in local optimization by changing a resolution, a frame rate, a color gamut, and a dynamic range of the video displayed in content layout 200 of video display 112 to optimize the computing resource load on video display processor 110 and video display 112 by adjusting a bit transfer requirement from video display processor 110 to video display. Accordingly, system 100 advantageously is able to display relatively higher resolution video, higher frame rate video, higher color gamut video, and/or higher dynamic range video within high quality rendering zone 214 (corresponding to foveal region 204) and immediately surrounding area of the field of view, while displaying relatively lower resolution video, lower frame rate video, lower color gamut video, and/or lower dynamic range video in the other zones of video display 112 without significantly reducing the quality of the viewer's visual experience. That is, high quality rendering zone 214 receives high quality renderings while medium quality rendering zone 216 and/or low-quality rendering zone 218 receive lower quality renderings, respectively. Nevertheless, the foveal portion of the human eye substantially views only the high-quality renderings.

In the exemplary embodiment, video display 112 is configured to display video at a rate of 120 fps in high quality rendering zone 214, while displaying video at a rate of 60 fps to the remaining areas of video display 112, such as medium quality rendering zone 216 and low-quality rendering zone 218. In the exemplary embodiment, the 120-fps frame rate is selected as a multiple of the 60-fps frame rate to achieve frame synchronization between the respective rendering zones. As the field of view moves, their eyes view different areas of video display 112. The saccadic motion is detected by video display processor 110, and video display processor 110 changes the center (e.g., central point 211) of high quality rendering zone 214 where the high frame rate video is displayed. In the exemplary embodiment, a source video file (not shown) is stored at 120 fps. In an embodiment, video display processor 110 is further configured to downscale the frame rate to 60 fps in peripheral region 208 and/or low-quality rendering zone 218.

In exemplary operation, eye tracking video camera 104 tracks the viewer's eye and transmits a video of the viewer's eye to video display processor 110. Video display processor 110 determines a first location for the field of view based on at least one frame from the images recorded by eye tracking video camera 104. Video display processor 110 then requests a video of stored image frames from video storage system 108. Video storage system 108 then transmits the video to video display processor 110. Video display processor 110 then transforms a first portion of the first received video into a first high-quality video and second portion of the video into a first low-quality video. Video display processor 110 then transmits the first high quality video and the first low quality video to video display 122. Video display 122 then displays the first high quality video in high quality rendering zone 214 centered on the first location and displays the first low quality video in medium quality rendering zone 216 and a low-quality rendering zone 218, both also centered on the first location.

In an alternative or additional operation, video display processor 110 determines a second location for the field of view based on at least one frame from the image frames recorded by eye tracking video camera 104. Video display processor 110 may then determine a field of view destination for the second location based on, for example, at least three frames from the image frames recorded by eye tracking video camera 104. Video display processor 110 requests a video of stored image frames from video storage system 108. Video storage system 108 transmits the video of stored image frames to video display processor 110. Video display processor 110 transforms a first portion of the second received video into a second-high quality video and a second portion into a second low quality video. Video display processor 110 transmits the second-high quality video and the second low quality video to video display 122. Video display 122 displays the second-high quality video in high quality rendering zone 214 centered on the second location and displays the second low quality video in medium quality rendering zone 216 and a low-quality rendering zone 218, both centered on the second location/destination.

In an embodiment, remote optimizations further optimize the bit transfer over electronic network 106 between video storage processor 114 and video display processor 110. In an exemplary embodiment, electronic network 106 includes one or more of an intra-computers bus, a local area network, and a wide area network such as the Internet.

Referring to FIG. 1, in an embodiment, electronic network 106 is the Internet, and video storage processor 114 is in a data center remote from video display processor 110. In operation, video display processor 110, with eye tracking video camera 104, determines a location of the field of view on video display 112 and centers high quality rendering zone 214 (FIG. 2) about the determined location (e.g., central point 211). Video display processor 110 is configured to then request video from video storage processor 114 having the highest predetermined resolution, frame rate, color gamut, and/or dynamic range. Video storage processor 114 obtains this requested high quality video from video storage device 116 and transmits the obtained video to video display system 102 for display (e.g., within high quality rendering zone 214, FIG. 2) on video display 112. In a similar manner, lower resolution, frame rate, color gamut, dynamic range is transmitted to video display system 102 for display on video display 112 within lower resolution rendering zones (e.g., rendering zones 216, 218, FIG. 2).

In an exemplary embodiment, video display 112 is configured to display a standard range of 3840 pixels in the left to right (x) dimension, and 2160 pixels in the top to bottom dimension (y). In this example, the high-quality rendering zone 214 can thus be configured to occupy 400×400 pixels at, for example, a 4K quality resolution, centered on the location of the field of view (e.g. central point 211). Further to this example, and video display processor 110 is configured to obtain the remainder of the pixel array at a lower resolution, such as 720p, for example, and map the lower resolution video to the higher resolution video. In operation, when the viewer shifts the field of view to a different part of video display 112, video display processor 110 is configured to then predict, within an optimal time period, where the field of view is shifting and re-center the higher resolution rendering zone for that relocated central point 211' on video display 112. The size of the high-quality rendering zone 214 is selected in consideration of measured latency of electronic network 106, such that high quality video is delivered from video storage processor 114 and displayed on video display 112 before the field of view arrives at relocated central point 211'.

In exemplary operation, eye tracking video camera 104 tracks the viewer's eye and transmits a video of the viewer's eye to video display processor 110. Video display processor 110 determines a first location for the field of view based on at least one frame from the video recorded by eye tracking video camera 104. Video display processor 110 then requests a video of stored image frames from video storage system 108. The video of stored image frames a first portion including a first high-quality video and a second portion including a first low-quality video. Video storage system 108 then transmits the first high quality video and the first low quality video to video display processor 110. Video display processor 110 then transmits the first high quality video and the first low quality video to video display 122. Video display 122 then displays the first high quality video in high quality rendering zone 214 centered on the first location for the field of view and displays the first low quality video in medium quality rendering zone 216 and a low-quality rendering zone 218, both also centered on the first location.

In an alternative or additional operation, video display processor 110 determines a second location for the field of view based on at least one frame from the image frames recorded by eye tracking video camera 104. Video display processor 110 may then determine a field of view destination for the second location based on, for example, at least three frames from the image frames recorded by eye tracking video camera 104. Video display processor 110 requests a video of stored image frames from video storage system 108. The video of stored image frames includes a third portion including a second-high quality video and a fourth portion including a second low quality video. Video storage system 108 then transmits the second-high quality video and the second low quality video to video display processor 110. Video display processor 110 then transmits the second-high quality video and the second low quality video to video display 122. Video display 122 then displays the second-high quality video in high quality rendering zone 214 centered on the field of view destination and displays the second low quality video in medium quality rendering zone 216 and a low-quality rendering zone 218, both centered on the field of view destination.

In an exemplary operation, the size of high quality rendering zone 214 may be optimized based on the latency of electronic network 106. In this example, electronic network 106 is determined to have a latency greater than 250 ms. That is, data transmitted over electronic network 106 takes longer than 250 ms to complete a round trip from and to the video display processor. Where, for example, a saccade covers 70 degrees, and has a duration of 233 ms, the size of high quality rendering zone 214 may be optimized such that video display processor 110 has sufficient time to detect the motion of the saccade and transmit a request to video storage processor 114 to change the focus location and/or resolution zone size. Alternatively, in a case where electronic network 106 has a latency less than 125 ms, optimization of the size of high quality rendering zone 214 may be more easily optimized with respect to, for example, a saccade covering 30 degrees with a duration of approximately 100 ms. The present embodiments are thus further advantageously able to measure the network latency and utilize the measured latency as a parameter to set the resolution quality for the several rendering zones.

Thus, in the example above, when electronic network 106 is measured to provide a generally consistent latency of approximately 125 ms or less, high quality rendering zone 214 is sized such that system 100 may set or shift the location of high quality rendering zone 214 before the detected field of view can move outside of high quality rendering zone 214. In one embodiment, the size of high quality rendering zone 214 is set, for example, to cover up to approximately 30 degrees in any direction from central point 211. That is, high quality rendering zone 214 may include a 30-degree radius circle on video display 112 centered about central point 211, with all other areas of video display 112 designated for medium quality rendering zone 216 and/or low-quality rendering zone 218. According to the exemplary embodiment, as the measured latency of electronic network 106 increases, video display processor 100 correspondingly reduces the size of high quality rendering zone 214. Accordingly, system 100 is further advantageously configurable to dynamically react to the measured latency of electronic network 106 by increasing or decreasing the size of high quality rendering zone 214.

In general, human eye motion is faster than human head, neck, or body motions. According to an alternative embodiment, the systems and methods described herein are implemented for video displays 112 including a plurality of surrounding screens (as opposed to a wearable viewscreen) that includes up to a 360-degree panorama in the horizontal and/or vertical directions. Referring to the previous example, in this alternative embodiment, video display processor 110 may set the size of high quality rendering zone 214 to be smaller than 30 degrees, since the human head viewing a 360-degree panorama (or smaller) will not move as quickly as the human eye, and thus system 100 will not generally have to respond as quickly to relocate central point 211 as it would have to base on saccadic eye motion alone.

Referring again to FIG. 1, a process 300 of optimizing video delivery based upon saccadic eye motion is also illustrated. Process 300 includes a detecting step 302, using eye tracking video camera 104, a field of view of at least one eye of the viewer, and thereby transmitting video display coordinates from the detected field of view to a video display processor 110. An identifying step 304 identifies a region on video display 112 corresponding to the transmitted video display coordinates and then further requesting, by video display processor 110, the immersive content from video storage processor 114 at a first resolution (not separately numbered) for a first portion of the immersive content and a second resolution (not separately numbered) for a second portion of the immersive content. In this exemplary process, the first resolution is higher than the second resolution. For example, the first resolution may represent a high-quality image rendering, such as 4k, and the second resolution may represent a relatively lower quality image rendering, as discussed above. Additionally, a third resolution, lower than the second resolution, may be implemented, for example, with respect to the outer peripheral region 208 or low-quality rendering zone 218.

Process 300 then proceeds to a receiving step 306, where video display processor 110 receives the first portion of the immersive content at the first resolution and the second portion of the immersive content at the second resolution, and then centers the corresponding display of the first and second portions of the immersive content about central point 211 of the region identified in step 304. In step 308, process 300 displays the centered corresponding first portion of the immersive content on video display 112 within a zone of the video display including central point 211 and displays the centered corresponding second portion of the immersive content on video display 112 outside of the zone occupied by the first portion of the immersive content. According to these advantageous processing embodiments, the data volume of the combined first and second video portions is significantly lower than a data volume if both the first and second portions were rendered at the same higher resolution. By utilizing measured saccadic eye motion data, alone or together with other parameters such as network latency, the present embodiments can significantly reduce the quantity of data transmitted, and the time to render the data on a display, in virtual reality applications without significantly reducing the quality of the content experienced by the viewer.

One non-limiting aspect of the present invention contemplates a visual coding system that provisions signaling and adjustment of intensity and resolution of light and/or color visual information in a rendered view based on the aspects of focal and peripheral vision relative to the position of eye. The visual coding system may take into consideration peripheral vision being more light sensitive and accordingly control bit allocation to favor luminance vs. color information. And whereas the fovea receives images in a direct line of vision that has the maximum resolution of cones which are less sensitive to light, and more sensitive to color, the visual coding system may correspondingly control the bit allocation to favor color information within the fovea. The visual coding system may scale images unequally or inconsistent across an entirety of a corresponding frame so as to vary resolution, luminance and/or chrominance according to related sensitivities of the human visual system (HVS). The in-frame or per frame variance in how images are coded throughout its metes and bounds may be beneficial in leveraging or expending bits according to capabilities of the HVS, which may include limiting bits allocated for color to portions of the individual image frames that the viewer's HVS can appreciate, e.g., limiting or reducing the number of bits allocated for color/chrominance within a peripheral vision of the user due to a relative inability of the viewer to appreciate color/chrominance within the peripheral vision. Such varying of coding across a frame may be accomplished by encoding segments of the frame in the peripheral (more light sensitive, less resolution) and segments of the frame in the fovea (more color sensitive, more resolution) differently. Techniques such as "tiling" within a frame also accomplish this varying encoding.

Our ability to sense color diminishes rapidly as the field of view approaches our periphery vision, such that color is essentially irrelevant (there are no cone photoreceptors) in the periphery vision and it need not be allocated any bits. When one looks directly at an object, the image is projected onto the fovea whereat the fovea has maximal visual acuity (high resolution) and a high density of cones (specialized photoreceptors to sense colors but relatively insensitive to light). If one looks at the same object using peripheral vision, the image is formed more eccentrically on the retina since the cones are sparse in the peripheral vision but high densities of rods are present. Rods do not detect color, but are much more sensitive to light than cones, and many rods converge onto a single ganglion cell such that rod responses can be summated to further increase light sensitivity in the periphery while degrading spatial resolution. One non-limiting aspect of the present invention contemplates allocating more bits to the chrominance information in the visual signal that is targeted for the fovea than the number of bits allocated for the visual signal targeted for the peripheral portion of the retina. That is, chrominance information is less relevant in our peripheral vision, and therefore bits that are allocated to the carriage of chrominance information for our peripheral vision are wasted bits. This capability may provide a more realistic visual experience that can allocate: higher spatial resolution in the signal targeting the fovea (foveated rendering); higher chrominance resolution in the signal targeting the fovea; and lower or almost no bits (i.e. low color and/or resolution) for chrominance in the signal targeting the outer portions of the retina.

The in-frame coding variances (e.g., lower chrominance in the peripheral vision) may operate in coordination with foveated rendering capabilities for allocating bits to the area in focus with higher spatial resolution and lower spatial resolution for the periphery. This capability may be used to facilitate reducing or lowering chrominance within the peripheral vision relative to the non-peripheral vision while also reducing image resolution within the peripheral vision relative to the non-peripheral vision. Coded video stream and coding system that tiles or otherwise segment portions of each frame may be utilized to facilitate the contemplated in-frame coding variances, e.g., each tile/segment within the metes and bounds of a particular image frame may be independently coded in layers for resolution, luminance and chrominance. Based on the position of the viewer's gaze (which is signaled by the display), an encoder/renderer can choose to allocate more resolution and color information to the tiles/segments that are mapped to the center of the viewer's gaze, and less color, i.e. more light information, for the tiles/objects mapped to the viewer's peripheral vision. A more realistic visual experience based on eye tracking or saccadic movement of the viewer may be employed to facilitate adjusting where the viewer's peripheral vision lies with respect to a display or other interface associated with rendering the image frames.

Figure 3:
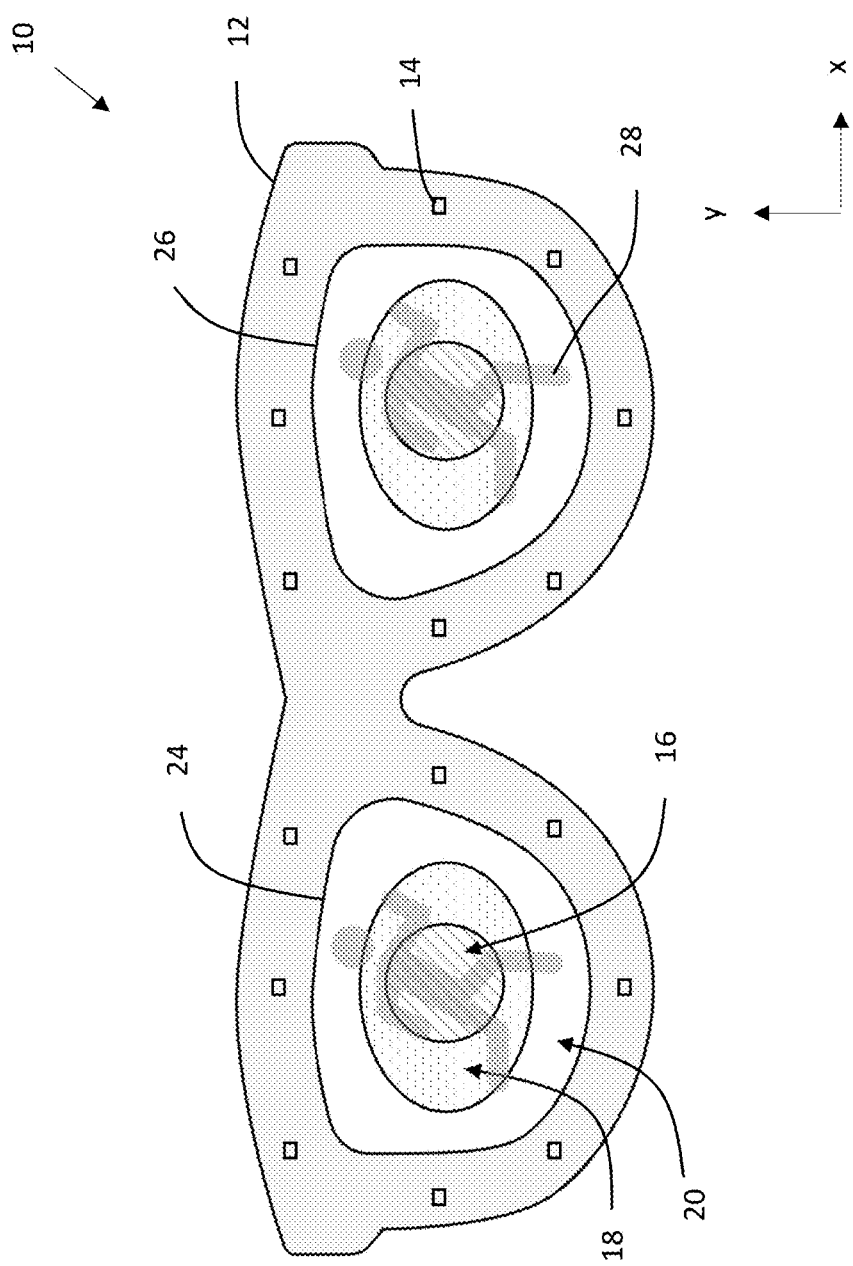
FIG. 3 illustrates a visual display system in accordance with one non-limiting aspect of the present invention.

FIG. 3 illustrates a video display system 10 in accordance with one non-limiting aspect of the present invention. The video display system 10 is exemplarily illustrated with respect to being an immersive, AR/VR or other video device 12 worn by a viewer. The system 10 may include a plurality of eye tracking cameras 14 or sensors to facilitate monitoring saccadic movement of the viewer and their attendant field of view, which is shown with respect to a fovea region 16, a blend region 18 and a peripheral region 20. The illustrated regions 16, 18, 20 within the viewer's field-of-view or gaze may be spatially related to first and second displays 24, 26 within which corresponding video images may be displayed. Positional coordinates of x, y may be used to define boundaries/areas for the viewing regions 16, 18, 20 as well as for matching segments on the displays 24, 26. The x, y coordinates for the viewing regions 16, 18, 20 may be used to map to related x, y coordinated portions of the displays, which in turn may be mapped to corresponding segments, tiles or other portions of an image frame 28 displayed therein. The viewer's field-of-view and the displays 24, 26 may be relatedly divided into segments or tiles for purposes of generating a relationship sufficient to relate the regions 16, 18, 20 to particular segments or tiles of the individual image frame 28, which may be each comprised of one or more pixels. The metes and bounds associated with each of the field of view, displays 24, 26 and the image frame 28 may be mapped relative to the eye tracking cameras 14 to facilitate coding individual portions of each image frame 28 relative to saccadic movement and sensitivities of the HVS.

The video display system 10 may include a calibration process whereby a viewer is instructed to undertake certain eye movements while wearing the device 12 for purposes of assessing individual nuances in the viewer's HVS, i.e., calibrate where the foveal, blend and peripheral regions 16, 18, 20 begin and end for individual viewers. The calibration process may also accommodate age of the viewer or other sensitivities that may affect how well the associated viewer can appreciate luminance and/or chrominance within certain portions of their field-of-view. The bitstream being coded to render the visual information via the displays 24, 26 may be flexible such that layers of bits can be progressively added to the rendered data (color or light information, additional spatial resolution) based on the center of focus/peripheral vision of the viewer. The attendant coding may optionally be performed in accordance with the capabilities and operations described in U.S. Pat. No. 9,100,631, entitled Dynamic Picture Quality Control, the disclosure of which is hereby incorporated by reference in its entirety herein, whereby various control parameters may be utilized to facilitate coding an uncompressed image into a compressed image at a rate sufficient to enable the attendant images to be sequentially displayed as video. The contemplated coding may facilitate in-frame differences being demarcated according to the illustrated boundaries between the foveal, blend and peripheral regions 16, 18, 20 or according to less demarcated or gradual changes, e.g., gradients could differentiate portions of the field-of-view rather than the illustrated boundaries.

Figure 4:
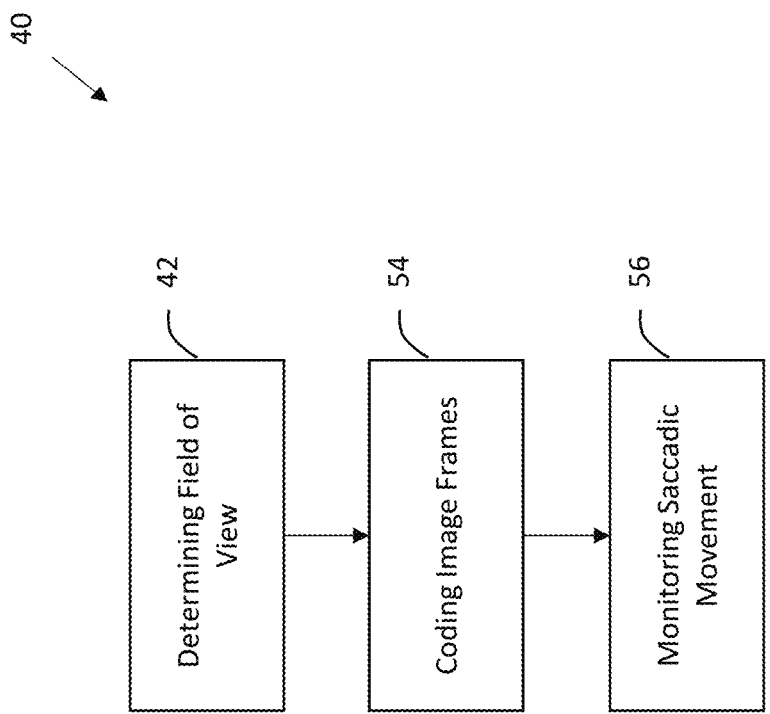
FIG. 4 illustrates a flowchart for a method for visual coding for sensitivities to light, color and spatial resolution in the HVS in accordance with one non-limiting aspect of the present invention.

FIG. 4 illustrates a flowchart 40 for an optimized method for visual coding for sensitivities to light, color and spatial resolution in the HVS in accordance with one non-limiting aspect of the present invention. The operations, processes and other manipulations associated with the illustrated flowchart may be facilitated entirely or partly with a processor of a renderer/encoder, or other element associated therewith, executing according to a corresponding plurality of non-transitory instructions stored on a non-transitory computer-readable medium. The method is predominately described for illustrative and exemplary purposes with respect to the HVS including sensitivities to light, color and spatial resolution throughout its field-of-view. The method is described with respect to making in-frame adjustments for luminance and/or chrominance, which may occur with or without corresponding in-frame resolution adjustments. The disparate resolutions within a particular image frame may be beneficial for the reasons described above, however, one non-limiting aspect of the present invention contemplates disparate luminance and/or chrominance variances within a particular image frame achieving benefits independent of those noted above such that the contemplated chrominance/luminance variances may be implemented in addition to or without of resolution variances.

Figure 5:
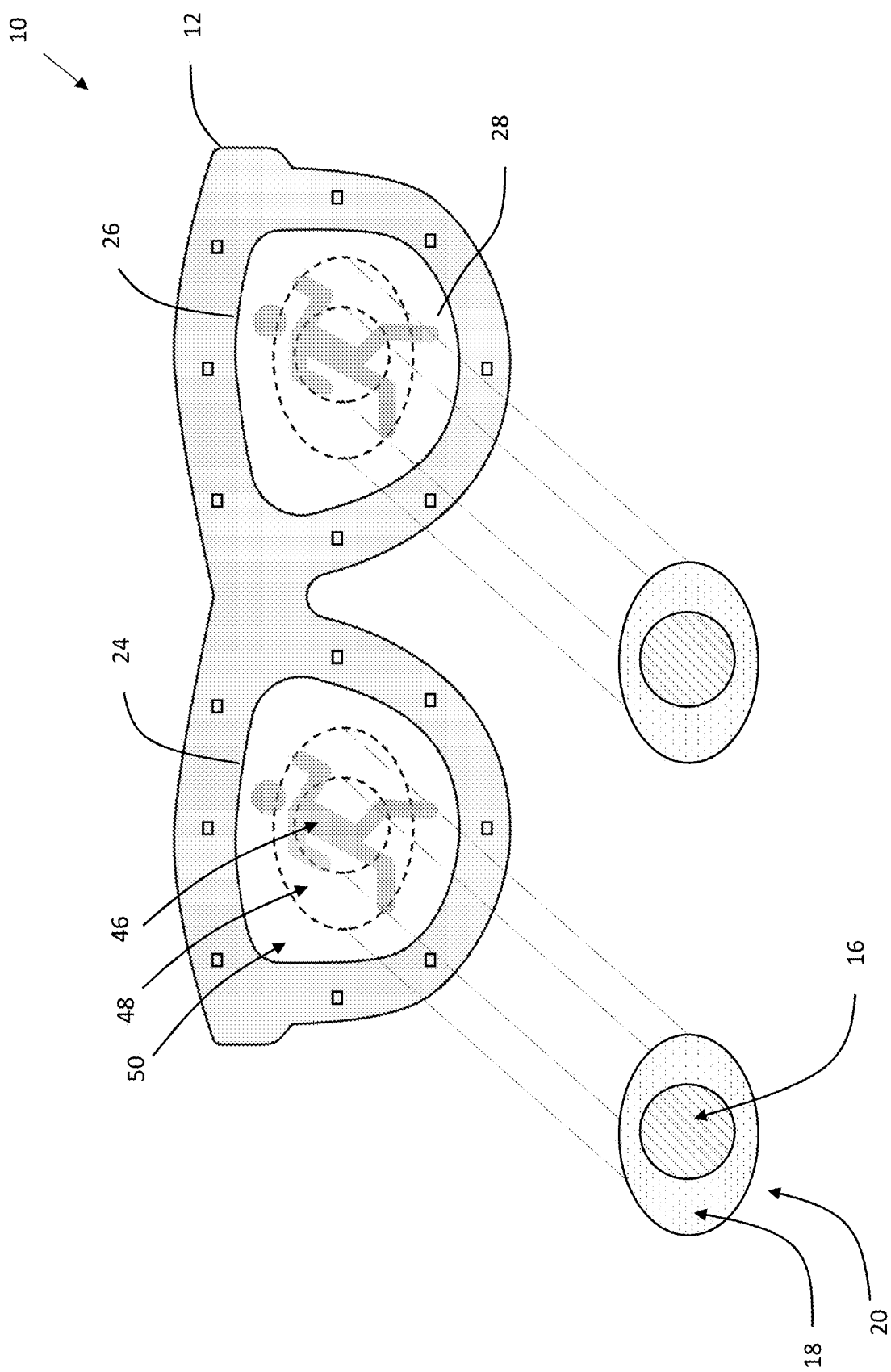

Block 42 relates to determining a field of view for a particular user, such as with a calibration process or other operation executed while the user is wearing the device. The field-of-view may be broken down into any number of regions, such as the above-described foveal, blend and peripheral regions, or according to other mapping techniques sufficient for identifying segments, tiles or particular areas within the field-of-view subjected to the noted sensitivities of the HVS. The field-of-view determination may take into consideration a size/shape of the display 24, 26 and the image frames 28 to create a relationship therebetween sufficient for correlations with the HVS regions 16, 18, 20 of sensitivity. FIGS. 5-6 illustrate a relationship between the HVS regions 16, 18, 20 of sensitivity and the display 24, 26 and the image frames 28 being sufficient for instructing an encoder/renderer to disparately code each image frame 28 such that different segments 46, 48, 50 of the same image frame are coded differently from the other segments 46, 48, 50 depending on whether the attendant segment falls within one of the HVS regions 16, 18, 20, e.g., depending on whether the segment 46, 48, 50 is aligned or coincidental with the foveal, blend or peripheral region 16, 18, 20, or more generically whether the segment 46, 48, 50 is aligned or coincidental with a peripheral region/vision 20 or a non-peripheral region/vision 16, 18.

Block 54 relates to coding image frames 28 according to the determined field-of-view. The coding may correspond with individually coding image frames 28 to be shown in sequence as a video such that segments, tiles or other divisions 46, 48, 50 within each image frame 28 are disparately coded with some portions of the same image frame being coded differently than other portions. One non-limiting aspect of the present invention contemplates segmenting or otherwise partitioning the individual image frames 28 according to virtually any level of granularity, such as by dividing the image frames into a number of individual segments 46, 48, 50. Individual segments 46, 48, 50 may then be grouped or associated with one of the HVS regions 16, 18, 20, e.g., multiple segments may be associated with each of the regions 16, 18, 20 or alternatively, the segments 46, 48, 50 as illustrated may be aligned with the HVS regions 16, 18, 20, i.e., such that each segment corresponds with one of the HVS regions (foveal, blend, peripheral, non-peripheral, etc.). The coding may generally correspond with generating a bitstream or other sufficient representation of the individual images to facilitate subsequent rendering according to the processes contemplated herein. The coding may be performed at a rate sufficient to facilitate making adjustments on a frame-to-frame basis such that the disparate coding in one image frame may be varied or changed in a next image frame.

Returning to the FIGS. 5-6, the image frames 28 being coded for the left and right eye may include three segments 46, 48, 50 of disparate coding to coincide with the foveal, blend and peripheral regions 16, 18, 20. The coding made occur at a sufficient granularity to enable the illustrated demarcation along corresponding boundaries defined in the x, y coordinate system or through other, more gradual scaling away from a center or central point of the viewer's gaze. One non-limiting aspect of the present invention contemplates utilizing coding tools to define a color gamut for the image frames 28, such as according to a Y, Cr, Cb type of color gambit whereby bit values are assigned for each of Y, Cr, Cb to define the luminance and chrominance associated therewith. The number of bits assigned to each of the values may be referred to as a color depth, i.e., number of bits needed to uniquely represent all of the possible colors that are in the media, and represented as bits per pixel (BPP), bits per component, bits per channel, bits per color, etc. The number of bits assigned to each of the Y, Cr, Cb values represent a level of coding according to customary color gambit scaling used to represent a quantization, color or shading variances/possibilities of color, e.g., a one 1-bit color, 2-bit color, 3-bit color . . . n-bit color. The corresponding color depth or n-bit color may be differentiated according to known color groupings, such as monochrome (1-bit color), standard dynamic range (SDR) (8-bit color), high dynamic range (HDR)(10-bit color), high color (15/16-bit color), true color (24-bit color), and Wide Color Gamut (WCG), etc.

An entirety of the display 24, 26 may be occupied by a singular image frame 28 having a coded resolution defining a resolution of the display (assuming the display includes capabilities sufficient to match the coded resolution). The illustrated frame 28 may be encoded as: a segment 50 associated with the peripheral region including a Y value of 10-bit, a Cr value of 8-bit and a Cb value of 8-bit (10, 8, 8); a segment 48 associated with a non-peripheral region including a Y value of 10-bit, a Cr value of 10-bit and a Cb value of 10-bit (10, 10, 10); and optionally if further granularity is desired an additional segment 46 associated with an additional non-peripheral region including a Y value of 10-bit, a Cr value of 12-bit and a Cb value of 12-bit (10, 12, 12). These BPP values are merely exemplary of the capabilities of the present invention to disparately code at virtually any granularity throughout the metes and bounds of a singular image frame 20. The presented Y, Cr, Cb values indicate a consistent luminance or matching luminance throughout the image frame 28, i.e., the peripheral and non-peripheral regions including the same 10-bit value for Y for exemplary purposes of describing one encoding methodology where luminance is consistent throughout. Each of the Y, Cr, Cb may be varied to produce other coding results, including varying the Y value between the peripheral and non-peripheral regions so as to adjust the luminance associated therewith, e.g., having a greater Y value in the peripheral region where susceptibility to luminance is better.

A lesser amount of data would be required to transmit a particular image frame 28 having lower BPP values than the same image frame 20 would require if coded at greater BPP values such that the capability to maintain higher BPP values in certain portions of the image frame 28 where luminance/chrominance may be better perceived and lower BPP values at other portions where luminance/comments may be less perceptible can maximize data usage for conveying images in a manner most useful giving sensitivities of the HVS. This capability, in comparison to coding systems that uniformly or consistently code image frames with the same luminance/chrominance throughout, may be beneficial in decreasing the amount of data needed to transmit the same images due to some bit values being reduced and/or to utilize the data saved by reducing some of the bit values to improve resolution and/or add more luminance/chrominance at desirable portions of the image to make the attendant video more realistic, i.e., to facilitate transmission of the video with the same amount of data consumption but with the data use being maximized relative to sensitivities of the HVS so as to provide a more realistic rendering at least in the sense of the luminance and chrominance being increased/decreased throughout an image frame to account for capabilities of the HVS to perceive luminance/chrominance within a particular field of view.

Returning to FIG. 4, Block 56 relates to monitoring the saccadic movement of the viewer as images are being successfully rendered as part of a video presentation to determine whether a viewer's gaze has shifted. FIG. 5 illustrates the user's gaze being essentially straightforward or centered within the displays 24, 26 of the device such that a center of the foveal aligns with a center of the corresponding display. The viewer's gaze may shift over time with the foveal moving in virtually any direction up, down, left, right or some combination thereof from the illustrated central location such that the foveal is centered or looking towards a different section or quadrant of the display. This eye movement may result in a portion of the peripheral region moving beyond a boundary of the corresponding display or produce other adjustments in the size and shape of the HVS regions. FIG. 6 illustrates saccadic movement where the peripheral region on a left half of the display increases with rightward movement of the fovea. One of the preceding processes may be returned to in response to the saccadic movement to facilitate making appropriate adjustments in the coding of image frames to be displayed thereafter, i.e., changing the special relationship of the HVS portions within successive frames.

As supported above, one non-limiting aspect of the present invention contemplates inconsistently or disparately performing in-frame or per-frame coding so as to adapt individual portions of individual frames according to sensitivities of the HVS. This may be particularly beneficial in maximizing bit usage and data consumption according to sensitivities of the HVS, such as by favoring chrominance over luminance within the peripheral region of a viewer's gaze. Various aspects of the description herein make reference to visual media, video and other forms of image rendering for exemplary non-limiting purposes as the present invention fully contemplates its use and application in facilitating coding of any media according to sensitivities of the HVS, particularly according to the above-described sensitivities associated with chrominance and luminance recognition limitations of the human eye.

Exemplary embodiments of immersive video systems and methods are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for visual coding comprising:
 determining a peripheral region and a non-peripheral region for an eye of a viewer;
 determining a media to be displayed to the viewer, the media including a plurality of image frames;
 reading the plurality of image frames for display as a plurality of read images, including reading each read image to include less color gamut within the peripheral region than the non-peripheral region;
 the media being a video with the image frames being uncompressed or original images compiled to comprise the video;
 reading the image frames into the read frames by downscaling the uncompressed or original images to include the less color gamut within the peripheral region than the non-peripheral region;
 compressing the read frames into a bitstream prior to transmitting the bitstream to a display used to display the media to the viewer, including compressing the read frames according to one or more values set for one or more picture quality parameters, the values being consistent throughout an entirety of each read frame such that the compression is the same within the peripheral and non-peripheral regions.

2. The method of claim 1 further comprising reading the peripheral and non-peripheral regions such that one includes more luminance than the other.

3. The method of claim 1 further comprising reading the non-peripheral regions to include a greater color depth than the peripheral regions, the color depth being measured as bits per pixel (BPP).

4. The method of claim 1 further comprising reading the peripheral and non-peripheral regions according to a Y, Cr, Cb type of color gamut, including reading the non-peripheral regions to include values for at least one of the Y, Cr, Cb different than the peripheral regions.

5. The method of claim 1 further comprising reading the non-peripheral regions to include more color than the peripheral regions.

6. The method of claim 1 further comprising reading the non-peripheral regions to include a resolution matching the peripheral regions.

7. The method of claim 1 further comprising reading the non-peripheral regions to include less light than the peripheral regions.

8. A method for coding image frames comprising: determining a field of view for an eye of a viewer to include a peripheral region and a non-peripheral region;
 downscalinq the image frames into coded frames such that the coded frames include less color gamut within the peripheral region relative to a corresponding region of the coded from image frame; and
 compressing the coded frames into a bitstream for rending to the viewer through a display, including compressing the coded frames according to one or more values set for one or more picture quality parameters, the values being consistent throughout an entirety of each coded frame such that the compression is the same within the peripheral and non-peripheral regions.

9. The method of claim 8 further comprising:
 defining chrominance for the coded frames according to bits per pixel (BPP) such that the peripheral region includes a lower BPP than the non-peripheral region, the coded frames consuming less data than the image frames; and
 compressing the coded frames into compressed frames, the compressed frames being delivered within the bitstream for rendering to the viewer, the compressed frames consuming less data than the coded frames.

10. The method of claim 8 further comprising:
 defining chrominance for the coded frames according to according to a Y, Cr, Cb type of color gamut such that the peripheral region includes values for at least one of Cr and Cb less than values for at least one of Cr and Cb of the non-peripheral region; and
 compressing the coded frames into compressed frames, the compressed frames being delivered within the bitstream for rendering to the viewer, the compressed frames consuming less data than the coded frames, the compressed frames being generated according to one or more values set for one or more picture quality parameters, the values set for the one or more picture quality parameters being the same within the peripheral and non-peripheral regions.

11. The method of claim 8 further comprising defining chrominance for the coded frames according to High dynamic range (HDR) such that the peripheral region includes a non-HDR and the non-peripheral region includes an HDR.

12. The method of claim 8 further comprising:
 coding the coded frames such that a spatial resolution within the peripheral region matches a spatial resolution of the non-peripheral region; and
 coding the coded frames such that luminance within the peripheral and non-peripheral regions is unchanged or proportionally equal relative to corresponding regions of the image frames.

13. The method of claim 1 further comprising non-scalably reading the image frames into the read frames on a one-to-one basis such that a quantity of the image frames equals a quantity of the read frames.

14. The method of claim 1 further comprising reading the image frames into the read frames without layering such that no more than one of the read frames is read for each one of the image frames.

15. The method of claim 1 further comprising scalably reading the image frames into the read frames such that at least two of the read frames are read for each of the image frames with one of the read frames being a base layer and at least one of the read frames being an enhancement layer.

16. The method of claim 1 further comprising reading the color gamut to include less chrominance within the peripheral region than the non-peripheral region.

17. The method of claim 8 further comprising compressing the coded frames into compressed frames, the compressed frames being delivered within the bitstream for rendering to the viewer, the compressed frames consuming less data than the coded frames, the coded frames consuming less data than the image frames.

18. A system for delivering an immersive content to a viewer over a network, comprising:
 a video display system configured to display the immersive content to the viewer; a video storage device configured to store the immersive content, and communicatively coupled with the video display system over the network;

an eye tracking device disposed proximate at least one eye of the viewer and configured to record a plurality of video frames of the at least one eye;

a video processing unit communicatively coupled with the eye tracking device, wherein the video processing unit is configured to (i) detect, from the plurality of video frames, an actual position of a field of view of the at least one eye within each plurality of video frames, (ii) determine, from the detected actual position of a sequence of the plurality of video frames, a saccadic motion of the at least one eye with respect to a first frame of the sequence, (iii) calculate a predicted position of the field of view of the at least one eye based on the detected actual position within the first frame and the determined saccadic motion, and (iv) adapt a color gamut by downscaling and transfer a portion of the immersive content to the video display system based at least in part on the predicted position of the field of view of the at least one eye; and wherein the video processing unit is configured to compress the immersive content into a bitstream prior before transfer to the video display system, including compressing the immersive content according to one or more values set for one or more picture quality parameters, the values being consistent throughout an entirety of the immersive content such that the compression is the same within the peripheral and non-peripheral regions.

* * * * *